April 21, 1970  F. L. SALISBURY  3,508,108
COMB-SHAPED CERAMIC SUPPORTS FOR HELIX
DERIVED SLOW WAVE CIRCUITS
Filed Jan. 16, 1967  4 Sheets-Sheet 3
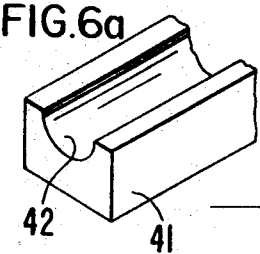
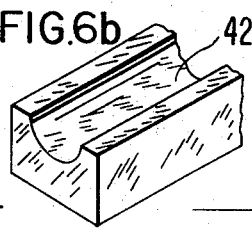
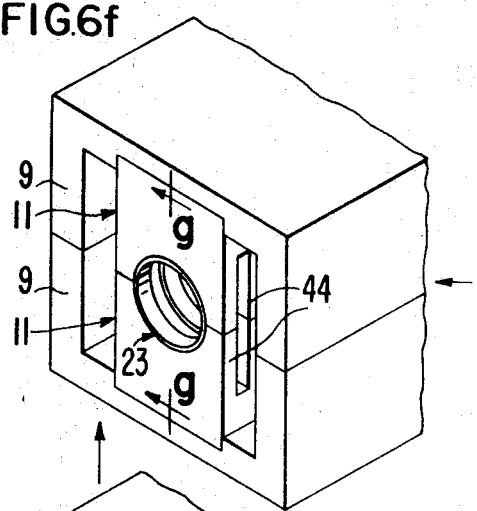
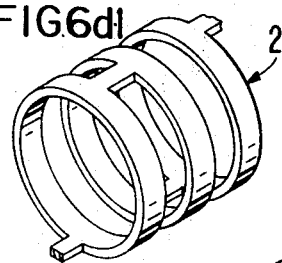
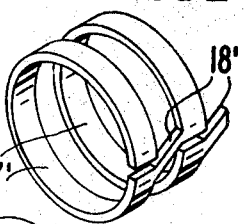
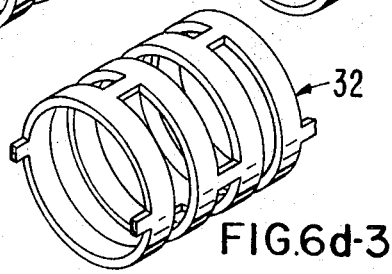
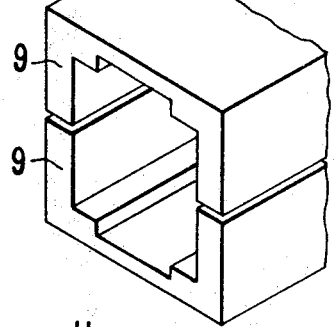
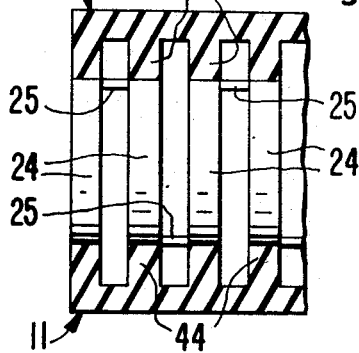
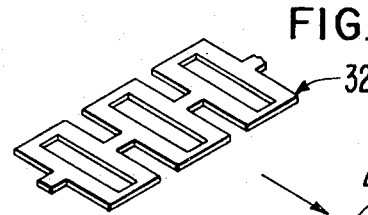
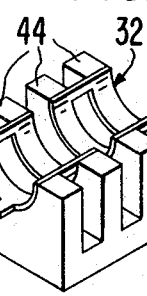
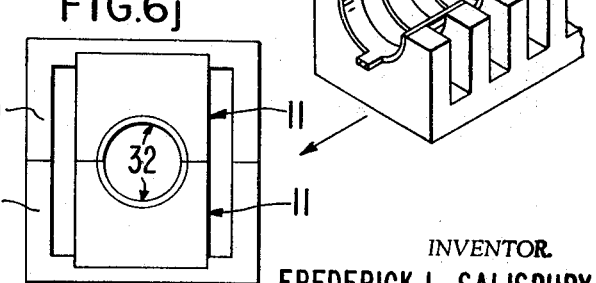
INVENTOR.
FREDERICK L. SALISBURY
BY
ATTORNEY April 21, 1970     F. L. SALISBURY     3,508,108
COMB-SHAPED CERAMIC SUPPORTS FOR HELIX
DERIVED SLOW WAVE CIRCUITS
Filed Jan. 16, 1967     4 Sheets-Sheet 4
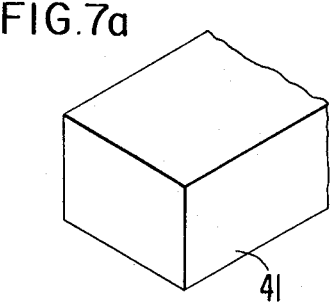
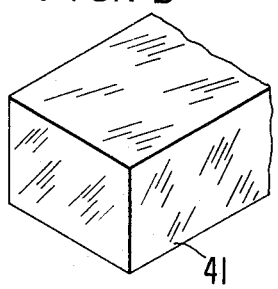
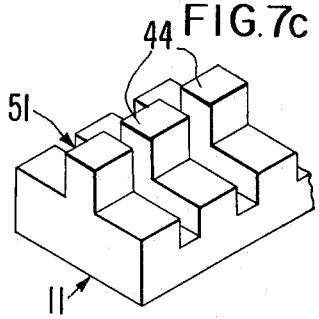
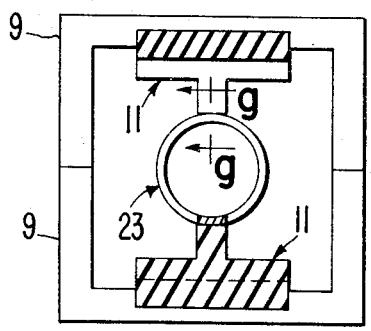
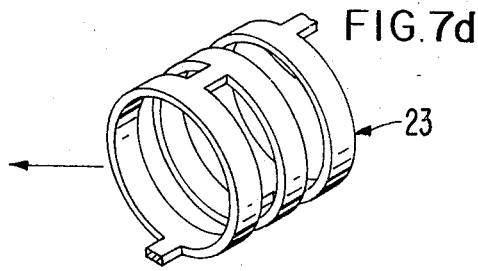
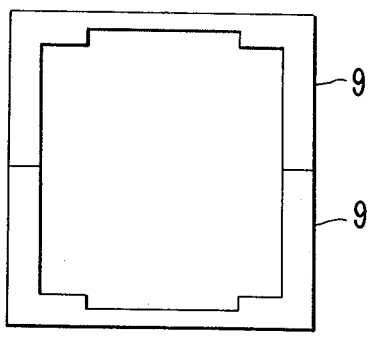
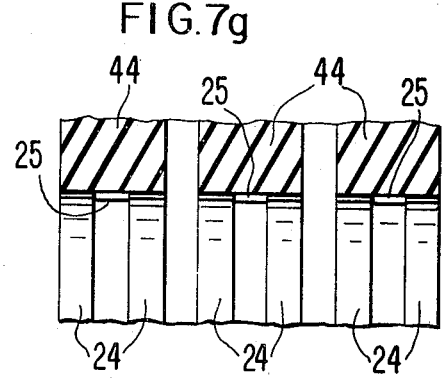
INVENTOR.
FREDERICK L. SALISBURY
BY
ATTORNEY United States Patent Office 3,508,108
Patented Apr. 21, 1970

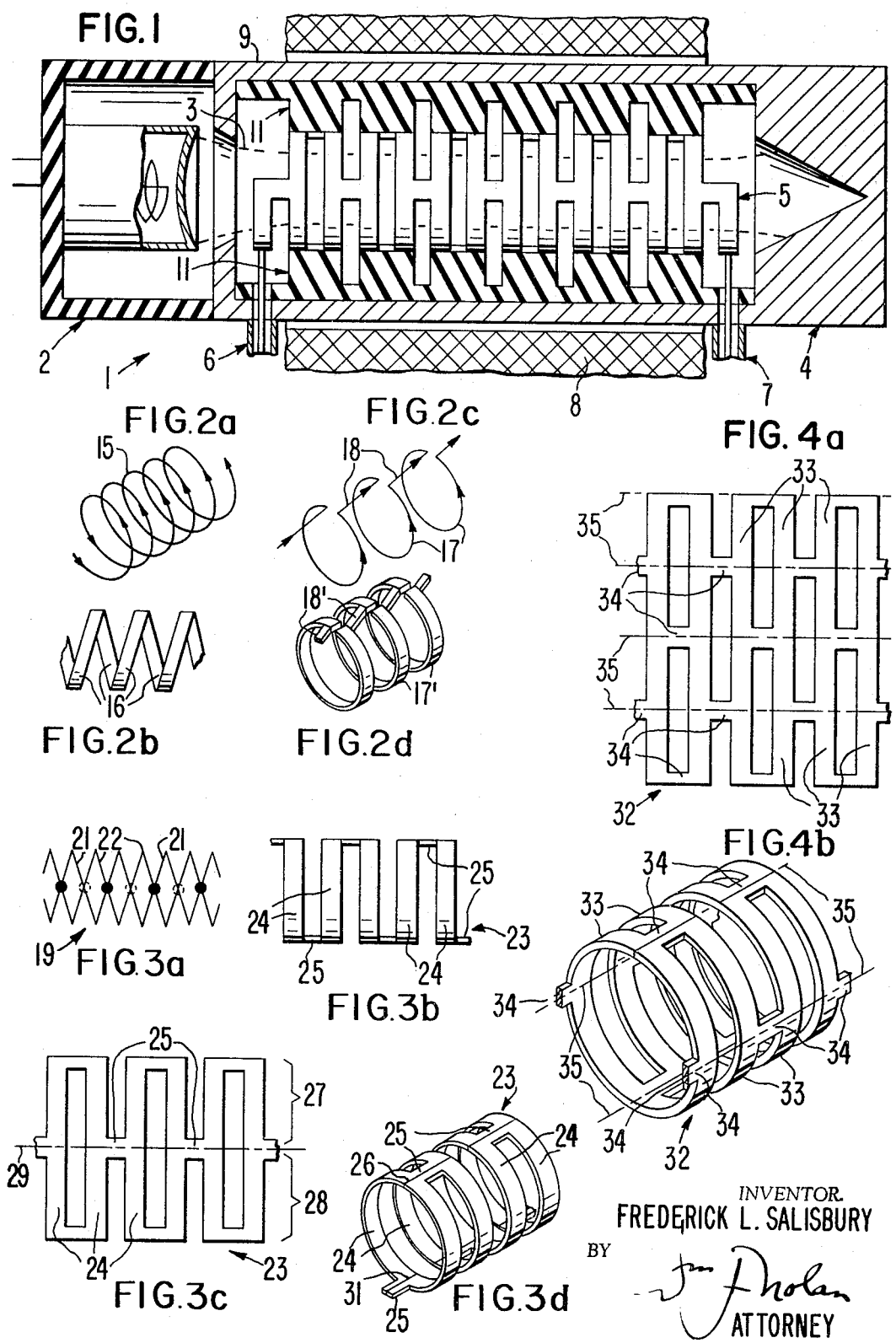

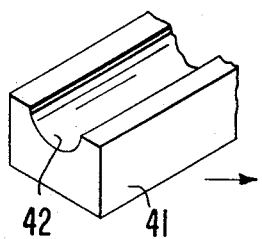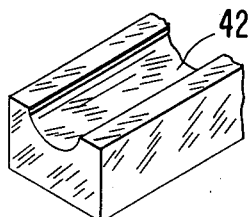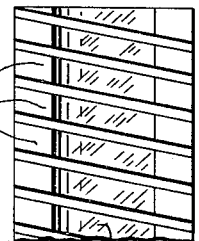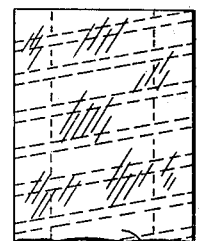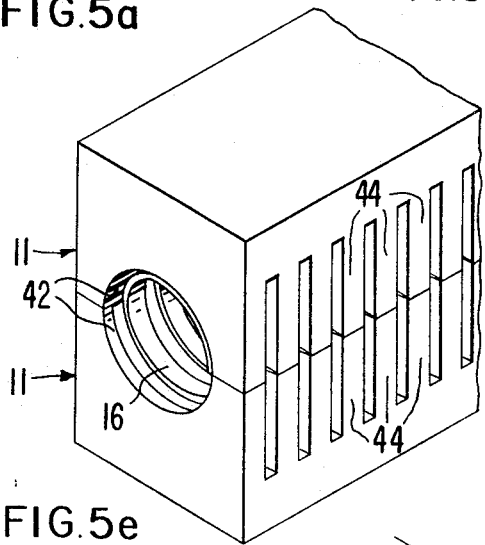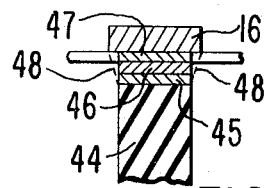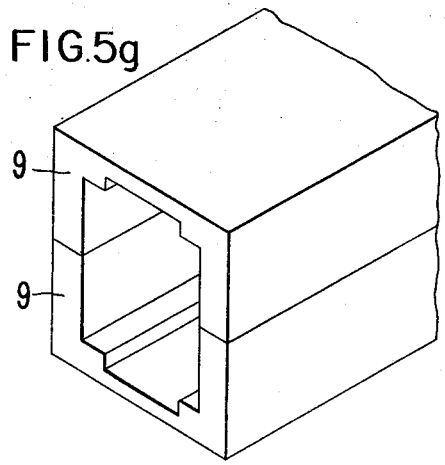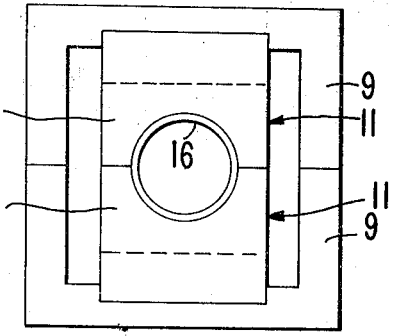

3,508,108
COMB-SHAPED CERAMIC SUPPORTS FOR HELIX DERIVED SLOW WAVE CIRCUITS
Frederick L. Salisbury, Los Altos, Calif., assignor to Varian Associates, Palo Alto, Calif., a corporation of California
Filed Jan. 16, 1967, Ser. No. 609,521
Int. Cl. H01j 25/34
U.S. Cl. 315—3.5                                4 Claims

ABSTRACT OF THE DISCLOSURE

Comb-shaped ceramic dielectric support structures are provided for supporting helix derived slow wave circuits such as helices, ring-and-bar and double ring-and-bar circuits. The fingers or teeth of the comb-shaped structures supportively contact the outer periphery of the loop or ring segments, and in some cases the bars, with the space between the supporting fingers being disposed in registry with the space between adjacent ring or loop portions of the circuit, whereby the capacitive loading of the circuit is minimized while providing ample support and thermal conductivity from the circuit to its surroundings. Several methods for fabricating comb supported slow wave circuits are described. One method calls for photoetching the circuit, forming same into a tube and brazing it into a pair of opposed combs which have been fabricated by slotting metallized blocks of beryllia to form the comb-shaped structures.

DESCRIPTION OF THE PRIOR ART

Heretofore, it has been proposed to support helix derived slow wave circuits such as helices, ring-and-bar circuits and doubly connected ring-and-bar circuits by a surrounding ceramic structure with the circuit being formed on the surface of a bore passing through the ceramic structure. The problem with this type of support is that it adds too much capacitive loading between adjacent turns of the helix derived circuit, thereby excessively reducing the electronic interaction of the circuit with a beam passable therethrough.

It has also been proposed to avoid the capacitive loading problem by supporting the circuit on an array of ceramic rings coaxially disposed of the circuit and interposed between the circuit and a surrounding barrel structure. The problem with this arrangement is that it is extremely difficult to fabricate for circuits operating at high microwave frequencies. For example, at Ku band the rings are only 0.015" wide. Such rings become fragile, difficult to handle for brazing and assembly and are easily fractured by thermal steps produced during brazing and in use.

BRIEF SUMMARY OF THE INVENTION

In the present invention, the helix derived slow wave circuits are supported from the finger tip portions of a ceramic comb structure. The ceramic comb structure is conveniently fabricated to extremely small dimensions by transversely slotting a ceramic bar. One or more comb structures may be positioned between the circuit and the surrounding barrel structure and the entire assembly brazed together to provide a relatively high power high frequency tube.

The principal object of the present invention is the provision of an improved support for helix derived circuits and tubes using same.

One feature of the present invention is a ceramic comb-shaped support structure for helix derived circuits wherein the circuit is supported from the finger tips of the comb structure.

Another feature of the present invention is the same as the preceding feature wherein the ring or loop portions of the helix derived slow wave circuit are brazed to the finger tip portions of the comb support structure.

Another feature of the present invention is the method of forming the comb support structure wherein a block of ceramic material is metallized, the metallizing cut off where undesired, and the block transversely slotted to form the finger portions of the comb.

Another feature of the present invention is the same as the preceding wherein the ceramic block is initially formed with a longitudinally directed trough portion and wherein the slow wave circuit is brazed within the metallized trough portion of the fingers.

Another feature of the present invention is the same as the preceding feature wherein the slow wave circuit is made by photoetching a flat sheet which is then formed into a tubular or semi-tubular shape and then brazed within the trough portion of the comb support.

Other features and advantages of the present invention will become apparent upon a perusal of the following specification taken in connection with the accompanying drawings wherein:

BRIEF DESCRIPTION OF THE DRAWINGS

FIG. 1 is a longitudinal sectional view, partly schematic, of a portion of a microwave tube employing features of the persent invention, FIG. 2(a) is a schematic perspective line diagram of a helix slow wave circuit, FIG. 2(b) is a longitudinal side view of a physical realization of the helix of FIG. 2(a), FIG. 2(c) is a schematic line diagram of an alternative helix slow wave circuit, FIG. 2(d) is a perspective view of a realization of the circuit of FIG. 2(c), FIG. 3(a) is a schematic line diagram of the contrawound helix, FIG. 3(b) is a side elevation of a ring-and-bar equivalent circuit to that of FIG. 3(a), FIG. 3(c) is a plan view of a photoetched circuit to be bent into a cylindrical form about its longitudinal axis to form one half of the slow wave circuit as shown in FIG. 3(d), FIG. 3(d) is a perspective view of a ring-and-bar circuit formed by fitting together two half circuits of the type shown in FIG. 3(c), FIG. 4(a) is a plan view of a photoetched circuit to be bent about a longitudinal axis to form the slow wave circuit of FIG. 4(b), FIG. 4(b) is a perspective view of the parallel contrawound helices, FIG. 5(a) is a perspective view of a ceramic block, FIG. 5(b) is a perspective view of a metalized ceramic block, FIG. 5(c) is a plan view of a slotted metalized ceramic block, FIG. 5(c–1) is a plan view of a metalized ceramic block slotted with slots of opposite pitch to that of FIG. 5(c) such that when the two blocks are fitted together the slots form a helix, FIG. 5(d) is a side elevational view of a helix slow wave circuit, FIG. 5(e) is a perspective view of the helix of FIG. 5(d) mounted within the blocks of FIGS. 5(c) and 5(c–1), FIG. 5(f) is an enlarged detail sectional view of the helix of FIG. 5(d) as brazed to one of the support fingers formed in the ceramic blocks, FIG. 5(g) is a perspective view of a conductive barrel structure for containing the slow wave circuit of FIG. 5(e), FIG. 5(h) is an end view of the barrel of FIG. 5(g) containing the circuit of FIG. 5(e) assembled therein, FIG. 6(a) is a perspective view of a ceramic block, FIG. 6(b) is a perspective view of a metalized ceramic block, FIG. 6(c) is a perspective view of a transversely slotted ceramic block, FIG. 6(d-1) is a perspective view of a ring-and-bar slow wave circuit, FIG. 6(d-2) is a perspective view of an alternative ring-and-bar circuit, FIG. 6(d-3) is a perspective view of parallel contrawound helices of the ring-and-bar type, FIG. 6(e) is a perspective view of a conductive barrel structure for housing slow wave circuits, FIG. 6(f) is a perspective view of the barrel structure of FIG. 6(e) containing the support structure of FIG. 6(c) and a slow wave circuit of FIG. 6(d-1), FIG. 6(g) is a sectional view of the structure of FIG. 6(f) taken along line g—g in the direction of the arrows, FIG. 6(h) is a perspective view of a photoetched circuit, FIG. 6(i) is a perspective view of a slotted ceramic block having a photoetched circuit of FIG. 6(h) fitted thereto, FIG. 6(j) is an end view of the barrel structure of FIG. 6(e) containing a pair of block structures of the type shown in FIG. 6(i), FIG. 7(a) is a perspective view of a ceramic block, FIG. 7(b) is a perspective view of a metalized ceramic block, FIG. 7(c) is a perspective view of a ceramic block provided with transverse slots and machined to form support fingers, FIG. 7(d) is a perspective view of a ring-and-bar slow wave circuit, FIG. 7(e) is an end view of a conductive barrel structure, FIG. 7(f) is an end view of the barrel of FIG. 7(e) containing the block supports of FIG. 7(c) and the supported slow wave circuit of FIG. 7(d), and FIG. 7(g) is an enlarged sectional view of a portion of the structure of FIG. 7(f) taken along line g—g in the direction of the arrows.

DESCRIPTION OF THE PREFERRED EMBODIMENTS OF THE INVENTION

Referring now to FIG. 1, there is shown a microwave tube 1 incorporating the features of the present invention. The tube 1 includes an electron gun assembly 2 for forming and projecting a beam of electrons 3 over an elongated beam path to a beam collector structure 4. A slow wave circuit 5 is disposed along the beam path for electronic interaction with the beam 3 comprising a hollow barrel structure 9 closed at one end by the gun assembly 2 and closed at the other end by the beam collector structure 4.

A plurality of axially directed ceramic comb structures 11 which are spaced apart at intervals around the periphery of the slow wave circuit 5 serve to support the slow wave circuit 5 from the barrel structure 9.

The slow wave circuit 5 may take any one of a number of different forms of helix derived geometries. For example, a number of such helix derived circuits are depicted in FIGS. 2–4. More specifically, FIG. 2(a) shows a simple helix circuit 15. An equivalent of the helix 15 is a conductive tube diagonally slotted from opposite sides to its diameter with slots of opposite pitch to produce a helix 16, as shown in FIG. 2(b). A topologically equivalent helix is a series of conductive loops 17 (see FIG. 2(c)) interconnected by conductors 18. A ring-and-bar equivalent to the circuit of FIG. 2(c) is shown in FIG. 2(d) wherein the bars 18' are equivalent to the connecting conductors 18 and the rings 17' are equivalent to the loops 17.

Referring now to FIG. 3(a) there is shown a contrawound helix derived slow wave circuit 19. The circuit comprises two helices 21 and 22 of the same size and pitch but wound in the opposite direction. The helices are connected together at their points of contact which contact point alternates from one side to the other each half turn of the separate helices. A topologically equivalent slow wave circuit to the contra-wound circuit is the ring-and-bar circuit 23 of FIG. 3(b). The ring-and-bar circuit 23 comprises an array of coaxially aligned rings 24 interconnected on alternating opposite sides by conductive bars 25. A convenient way to fabricate the ring-and-bar circuit 23 is to photoetch a conductive pattern, as shown in FIG. 3(c), out of a sheet of metal, such as copper or molybdenum. The photoetched pattern is then rolled into a tube, as shown in FIG. 3(d), to form the ring-and-bar circuit 23. At the mating marginal edges of the pattern as rolled to form the tube, the mating edges form a seam 26. This seam need not permit conduction thereacross. In fact, there need not be physical contact at the seam 26 and a gap may be left between the marginal edges of the pattern. Moreover, it is possible to form the conductive pattern of FIG. 3(c) in two halves 27 and 28 separated along the center line 29. The two halves may then be formed into semi-cylindrical segments and matched to form the tubular structure of FIG. 3(d). In this case, there will be two seams 26 and 31. As before, these seams need not permit conduction thereacross nor do they need to be physically contacting.

Referring now to FIG. 4, there is shown a doubly connected ring-and-bar helix derived slow wave circuit 32. The circuit 32 comprises an array of coaxially aligned conductive rings 33 with each ring connected to the next ring by a pair of diametrically opposed conductive bars 34. As the circuit advances from ring to ring, the position of the connecting bars 34 rotates about the periphery of the rings by 90°. A convenient way to fabricate the doubly connected ring-and-bar circuit of FIG. 4(b) is to photoetch a conductive pattern, as shown in FIG. 4(a), and roll the pattern into a tube as shown in FIG. 4(b). The circuit 32 is equivalent to two parallel connected ring-and-bar circuits of FIG. 3 and this is easily seen by comparing the conductive patterns of FIGS. 3(c) and 4(a). As a result, the composite circuit 32 may be fabricated with non-conductive axial directed joints or gaps corresponding to lines 35 of FIG. 4(a) which joints or gaps fall in axial lines dividing all the bars 34 of the tubular circuit of FIG. 4(b).

Referring now to FIG. 5, there is shown a flow diagram depicting a method for fabricating a comb supported helix slow wave circuit 16 of the type shown in FIG. 2(b). At (a), a ceramic rod 41, as of alumina or beryllia, preferably beryllia, is formed with a trough 42 having a curvature equal to that of the outside periphery of the helix 16. At (b), the ceramic rod is covered with a metallic coating, as of tungsten or molybdenum-manganese metallizing material. The tungsten is conveniently applied by sputtering tungsten in an evacuated chamber onto the rod 41. The molybdenum-manganese is conveniently painted onto the surfaces and fired in a reducing hydrogen atmosphere. The metallic coating is conveniently applied to a thickness of 0.0002". A gold flash is then applied to a thickness of 0.0001" over the tungsten coat and 0.00002" over the Mo-Mn coat.

Then at FIG. 5(c) and (c-1), the coated rods 41 are ground or lapped to remove the coating from surfaces which are not to be brazed leaving the coating on the trough and bottom surfaces 42 and 43 respectively. Two coated rods 41 are then diagonally slotted by a dicing machine which laps partially through the ceramic rods 41 to produce a pair of comb-shaped ceramic structures 11 having a spine portion with fingers 44 projecting therefrom. As an alternative, the slots may be cut by a diamond grinding wheel; however, the dicing machine, which employs an array of reciprocating blades operating with an abrasive slurry, is preferred. The slots are cut with the same pitch as that of the helix 16, shown at FIG. 5(d) and fingers 44 are formed by the lands between adjacent slots.

The helix 16 is assembled with the comb-shaped support structures 11, as shown in FIG. 5(e). Care is taken to properly jig the assembly such that the outer periphery of each turn of the helix 16 is in registration with the curved trough portion 42 of each finger 44 of the comb structures 11.

Referring now to detail FIG. 5(f), a silver sheet 47 is layed in between the helix 16 and the gold flash coating 46 overlaying the tungsten coating 45 of the fingers 44. A suitable thickness for the silver sheet is 0.0005". The helix 16 is typically made of copper or molybdenum with a wall thickness as of 0.0055" and provided with a gold plating of 0.00002" thick.

The barrel structure 9 is fabricated in two halves as shown in FIG. 5(g) and assembled with the assembled helix and support combs 11, as shown in FIG. 5(h). The assembly is then heated to brazing temperatures, as of 950° C., in a moist hydrogen reducing atmosphere. Under these conditions, the silver sheet 47 melts and forms a brazing fillet or bond between the turns of the helix 16 and the trough portion of the ceramic support fingers 44. The fillet is shown by the dotted lines 48 of the detail of FIG. 5(f). The barrel structure 9 is also brazed to the bottom metallized surface 43 of the comb support structures 11. In addition, the mating surfaces of the two halves of the barrel structure are brazed together to form the central portion of the tubes evacuated envelope. The barrel 9 is preferably made of a material having a coefficient of linear thermal expansion substantially equal to that of the ceramic comb support. Suitable materials for the barrel 9 include molybdenum or an aggregate material composed of a porous tungsten body infiltrated with silver or copper, the body being 65% tungsten by volume. Tubes having an aggregate body material matched to a ceramic structure brazed thereto are described and claimed in copending U.S. application 609,573 abandond, filed Jan. 16, 1967 and assigned to the same assignee as that of the present invention.

The advantage of the helix support structure of FIG. 5 is that the helix is supported substantially over its entire outer periphery by a support structure having relatively good thermal conduction to its surroundings. In this manner, an extremely rugged slow wave circuit having high power handling capability is obtained. The comb type support 11 does not add appreciable capacitive loading to the circuit because the ceramic material is removed from the regions of intense electric field largely concentrated in the spaces between the opposed edges of adjacent turns of the helix 16.

Referring now to FIG. 6, there is shown a method for fabricating comb supported ring-and-bar type slow wave circuits. This method is similar to that described previously with regard to FIG. 5 except that the slots formed in the ceramic rod 41 are cut in planes perpendicular to the axis of the rod 41, instead of being cut diagonally across the rod 41.

Any one of the various ring-and-bar type circuits such as, for example, 23 or 32 is positioned between a pair of the ceramic comb structures 11 with the trough portions 42 of the fingers 44 in registration with the ring or loop portions 24 of the circuit, as shown in FIG. 6(g). The fabricated barrel structure 9 is then fitted around the assembly and brazed, as aforedescribed.

As an alternative, the ring-and-bar circuits 23 and 32 may be formed in two halves as depicted at FIGS. 6(h) and (i) and as described with regard to FIGS. 3(c) and 4(b). These half circuits are rolled, positioned in the comb structures 11, enclosed by the barrel 9 and brazed, as shown in FIG. 6(j).

In a typical example of a comb supported doubly connected helix slow wave circuit for operation at Ku band the combs 11 are 2.5" long, 0.077" high and 0.115" wide and made of beryllia. The fingers 44 are 0.016" thick, 0.005" long and the trough 42 has a radius of curvature of 0.036". The slots are 0.014" wide and there are approximately 80 slots in each comb 11. The ring-and-bar circuit is made of molybdenum tubing with a wall thickness of 0.0055" and the rings are 0.018" wide with a gap of 0.012" and an outside diameter of 0.072". The bars have a width of 0.015."

Referring now to FIG. 7, there is shown an alternative comb support for ring-and-bar circuits and a method for fabricating same. In this case, the ring-and-bar circuit is supported at the bar members, instead of at the ring members. The circuit is supported from the finger tip portions of ceramic comb structures 11 disposed around the periphery of the circuit. The bars serve to shield the ceramic fingers 44 from the intense electric fields of the circuit and since the combs 11 made contact with only a limited peripheral extent of the rings, the capacitive loading of the circuit by the ceramic support structure is minimized. On the other hand, the thickness of the support fingers, taken in the axial direction of the circuit, is equal to about the thickness of two rings plus the space therebetween. Thus, the ceramic support fingers are about three times the thickness of the fingers if they directly supported the ring portions, as described with regard to FIG. 6 above.

The ceramic comb support structures 11 are fabricated by coating a ceramic rod 41 (FIG. 7(a)) with a metallic coating, as previously described, to form a metallized rod 41 (FIG. 7(b)). The metallized rod 41 is then ground to form the rod 41 with a ridge 51 and to remove metallizing material from all surfaces except those to be brazed. The rod 41 is then transversely slotted with an array of slots to define an array of fingers 44.

The ring-and-bar circuit is then formed and it may be either of the single or doubly connected type 23 or 32 (FIG. 7(d)). The barrel structure 9 is also fabricated (FIG. 7(e)). The slow wave circuit 23 and combs 11 are then assembled within the barrel 9, as shown in FIG. 7(f), and brazed together to form a composite structure. The comb supported ring-and-bar circuit, which is supported via the bars, is described and claimed in copending U.S. application 609,466, abandoned, filed Jan. 16, 1967 and assigned to the same assignee as the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a microwave tube apparatus, means forming a helix derived slow wave circuit having an array of axially spaced coaxially aligned conductive loop portions conductively connected together, means for forming and projecting a beam of electrons axially through said loop portions for electronic interaction with the microwave fields of said slow wave circuit, means forming a barrel structure surrounding said slow wave circuit, means forming an insulative support structure having an array of ceramic insulative support member portions spaced apart along the axis of said slow wave circuit, said support member being interposed between said slow wave circuit and said surrounding barrel structure, the improvement wherein said insulative support structure is a comb-shaped structure having a spine portion and an array of axially spaced ceramic insulative fingers projecting therefrom, said fingers serving to support said slow wave circuit from said surrounding barrel structure, said fingers being aligned with portions of said helix derived slow wave circuit, and the spacing between said fingers being out of alignment with said helix derived slow wave circuit, whereby said fingers are shielded from intense electric fields on said slow wave circuit in operation.

2. The apparatus of claim 1 wherein said ceramic support fingers are brazed to said slow wave circuit.

3. The apparatus of claim 1 wherein said ceramic support fingers include a curved trough portion at their tips conforming to the curvature of the outer periphery of said conductive loop portions of said slow wave circuit, and said support fingers being bonded to the outer periphery of said loop portions.

4. The apparatus of claim 1 wherein said spine portion of said comb structure is bonded to said surrounding barrel structure.

References Cited

UNITED STATES PATENTS

| | | | |
|---|---|---|---|
| 2,828,440 | 3/1958 | Dodds et al. | 315—3.6 |
| 2,922,067 | 1/1960 | Van Dien | 315—3.5 |
| 3,107,312 | 10/1963 | Kennedy | 315—3.5 |
| 3,271,614 | 9/1966 | Scott | 315—3.5 |

ELI LIEBERMAN, Primary Examiner

S. CHATMON, JR., Assistant Examiner

U.S. Cl. X.R.

315—37.3; 333—31